(12) United States Patent
MacArthur et al.

(10) Patent No.: US 11,307,013 B2
(45) Date of Patent: Apr. 19, 2022

(54) BOLLARD DRILLING JIG

(71) Applicant: Honda Motor Co., Ltd., Tokyo (JP)

(72) Inventors: Benjamin MacArthur, Barrie (CA); Peter G Munro, Lisle (CA); Mehul Rana, Brampton (CA)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/000,418

(22) Filed: Aug. 24, 2020

(65) Prior Publication Data
US 2022/0057187 A1 Feb. 24, 2022

(51) Int. Cl.
| | |
|---|---|
| *G01B 5/24* | (2006.01) |
| *G01B 5/14* | (2006.01) |
| *E01F 13/12* | (2006.01) |
| *E21B 12/00* | (2006.01) |
| *E21B 7/02* | (2006.01) |

(52) U.S. Cl.
CPC .............. *G01B 5/143* (2013.01); *E01F 13/12* (2013.01); *E21B 12/00* (2013.01); *E21B 7/027* (2013.01)

(58) Field of Classification Search
CPC .................................. G01B 5/143; E21B 12/00
USPC ............................................ 33/562, 613, 645
See application file for complete search history.

(56) References Cited

U.S. PATENT DOCUMENTS

| | | | | |
|---|---|---|---|---|
| 4,559,716 A * | 12/1985 | Daughtry | ................ | E21B 41/10 33/529 |
| 4,763,507 A * | 8/1988 | Zofchak | ................... | G01B 3/30 33/502 |
| 6,490,803 B1 * | 12/2002 | Butters | ................ | E04G 21/1833 33/1 LE |
| 6,658,753 B2 * | 12/2003 | Tatarnic | ................... | G01C 9/28 33/613 |
| 6,860,029 B2 * | 3/2005 | Haynes | ................... | B23B 41/12 33/302 |
| 7,255,144 B2 * | 8/2007 | Smith | .................... | B23Q 3/007 144/253.1 |
| 7,546,691 B2 * | 6/2009 | Mackey | ................... | G01B 3/20 269/166 |
| 7,861,434 B2 * | 1/2011 | Knudsen | ................. | E04H 17/22 33/613 |
| 8,177,086 B2 | 5/2012 | Marquis-Martin | | |
| 9,133,589 B2 | 9/2015 | Ball | | |
| 10,655,359 B2 * | 5/2020 | Hemingway | ......... | E04H 17/263 |

FOREIGN PATENT DOCUMENTS

| | | |
|---|---|---|
| CN | 202529115 U | 11/2012 |
| KR | 20120007540 U | 1/2012 |
| KR | 20130020382 A | 2/2013 |
| KR | 200472040 Y1 | 4/2014 |

* cited by examiner

*Primary Examiner* — George B Bennett
(74) *Attorney, Agent, or Firm* — Armstrong Teasdale LLP

(57) ABSTRACT

A bollard drilling jig including a base plate, an elongated bar coupled to the base plate, and at least two guide collars spaced apart from each other on the elongated bar. The at least two guide collars each include an interior channel that is sized to receive a drilling tool therethrough.

18 Claims, 4 Drawing Sheets

BOLLARD DRILLING JIG

BACKGROUND

The present disclosure relates generally to bollard installation and, more specifically, to a drilling jig that facilitates core drilling for bollard installation.

A bollard is a rigid, sturdy vertical post that may be used in civic, industrial, and/or commercial settings. For example, known bollards may be used to protect structures and/or objects from collision damage, such as from passenger vehicles, fork lifts, and the like. Accordingly, frequently it is common to position multiple bollards along a path at regularly-spaced intervals to form a barrier. One known method of installing bollards includes core-drilling holes that are several feet deep, filling the holes with cement, and positioning a bollard within the hole as the cement sets around the bollard. For barriers formed from multiple bollards, the drilling location for each bollard must be individually measured and marked based on a desired spacing between adjacent bollards. The task of measuring and marking each drilling location may be time-consuming, and laborious task that may produce inaccurate and/or non-repeatable measurements as a result of human error.

BRIEF DESCRIPTION

In one aspect, a bollard drilling jig is provided. The bollard drilling jig includes a base plate, an elongated bar coupled to the base plate, and at least two guide collars spaced apart from each other on the elongated bar. The at least two guide collars each include an interior channel that is sized to receive a drilling tool therethrough.

In another aspect, a bollard drilling jig is provided. The bollard drilling jig includes a base plate and an elongated bar extending across the base plate such that a first end and a second end of the elongated bar are each positioned a distance from the base plate. A guide collar is coupled to each of the first end and the second end of the elongated bar, wherein. The guide collar includes an interior channel that is sized to receive a drilling tool therethrough.

In yet another aspect, a bollard drilling jig is provided. The bollard drilling jig includes an elongated bar and at least two guide collars spaced apart from each other on the elongated bar. The at least two guide collars each include an interior channel that is sized to receive a drilling tool therethrough. At least two alignment features are spaced from each other on the elongated bar. The at least two alignment features are configured to receive a tensioned line therethrough, and an alignment axis extending between the at least two alignment features is oriented substantially perpendicularly with the drilling axis.

DETAILED DESCRIPTION

The embodiments described herein relate generally to a drilling jig that facilitates core drilling for bollard installation. In the exemplary embodiment, the bollard drilling jig includes an elongated bar and at least two guide collars coupled thereto. The guide collars are sized to receive a hole drilling tool or drill bit therethrough. When extended through the guide collars, the drilling tool is guided along a drilling axis that may be oriented to form bollard holes at a desired angle within the ground. For example, in one embodiment, a base plate is coupled to the elongated bar. The base plate may be mounted to the ground, and includes a flat mounting surface that is oriented substantially perpendicularly relative to the drilling axis of each guide collar. Accordingly, the base plate automatically orients the drilling axes substantially vertically when the base plate is properly positioned on a ground surface that is substantially planar. In addition, the guide collars may be spaced a predetermined distance apart from each other on the elongated arm. In the exemplary embodiment, the spacing between the guide collars is variably selected to correspond to a desired spacing between adjacent drilling locations for adjacent bollards to be installed. Thus, the jig enables multiple bollard holes to be drilled in a quick, accurate, and consistently-spaced manner.

Figure 1:
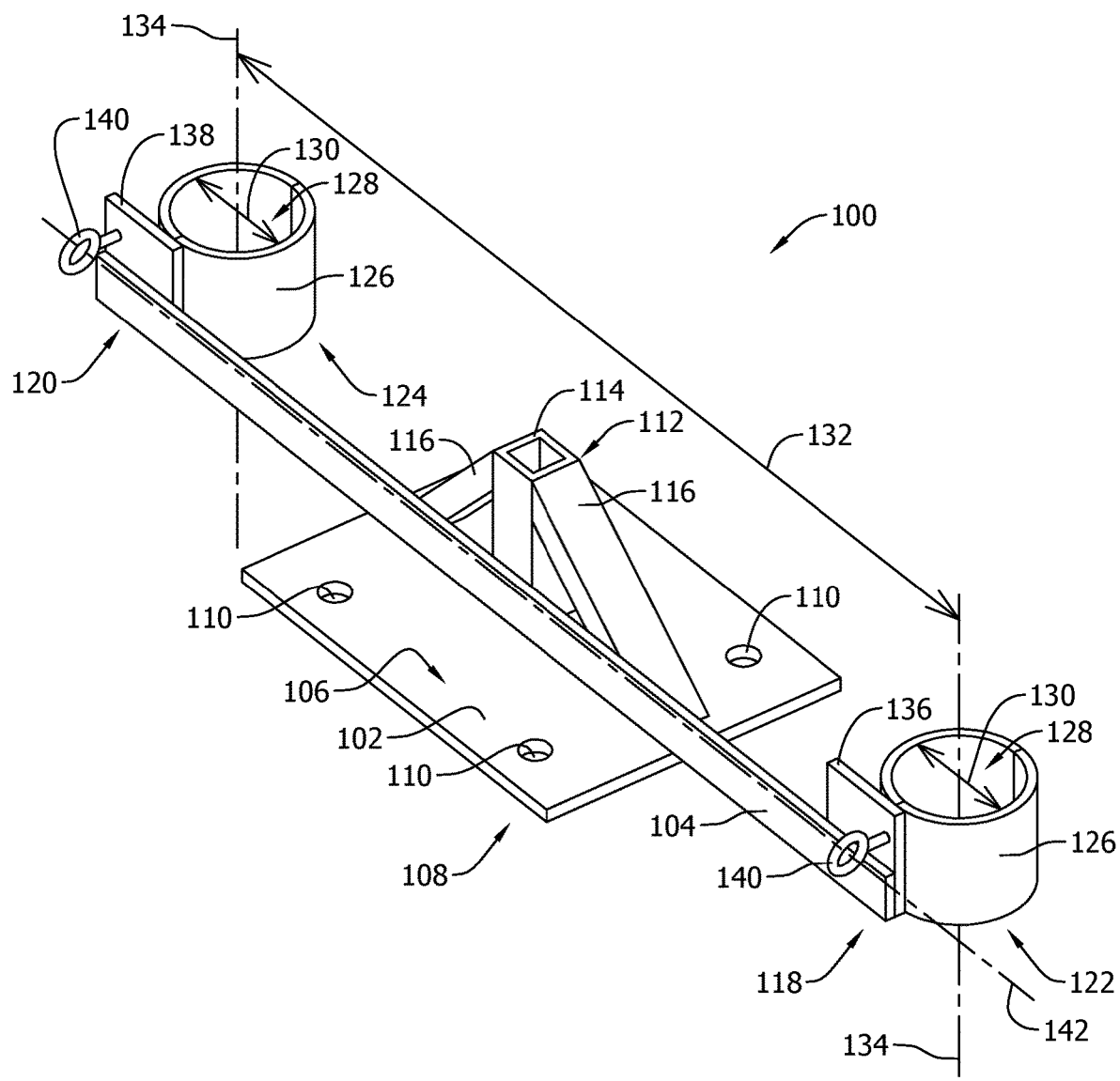
FIG. 1 is a front perspective view of an exemplary drilling jig that may be used during installation of bollards.

FIG. 1 is a front perspective view of an exemplary bollard drilling jig 100. In the exemplary embodiment, jig 100 includes a plurality of components or sub-parts that are coupled together to form a unitary structure. For example, the components or sub-parts described herein may be fabricated from a metallic material, such as steel or aluminum, and may be coupled together via any suitable welding technique. Accordingly, when fully assembled, jig 100 is a rigid and durable structure that tolerates prolonged use with mechanical tools, such as drilling tools, drill bits, and the like. In alternative embodiments, jig 100 may be fabricated from any suitable material, and be assembled via mechanical means (e.g., fasteners, screws, and/or bolts).

In the exemplary embodiment, jig 100 includes a base plate 102 and an elongated bar 104 coupled to base plate 102. Base plate 102 includes an upper surface 106 and a bottom surface 108. Elongated bar 104 extends across, and is coupled to, upper surface 106. Bottom surface 108 is substantially planar, and is adapted to be positioned against the ground at a desired drilling site, for example. Base plate 102 also includes a plurality of mounting holes 110 defined therein. Mounting holes 110 are each sized to receive a fastener (not shown) therethrough, and each is defined at a different drilling location relative to the surface area of base plate 102. The fasteners are inserted through mounting holes 110 to facilitate securing base plate 102 to the ground at the drilling site, and to facilitate restricting rotational movement of base plate 102 relative to the ground. Accordingly, as will be described in more detail below, base plate 102 enables jig 100 to be maintained in a predetermined alignment when forming bollard holes within the ground.

Jig 100 also includes a frame 112 coupled to upper surface 106 of base plate 102. In the exemplary embodiment, frame 112 includes a vertical post 114 and a pair of support posts 116 that extend between base plate 102 and vertical post 114. Support posts 116 are oriented obliquely relative to base plate 102 and vertical post 114, and are each coupled to upper surface 106 to facilitate enhancing the rigidity of base plate 102. Frame 112 is also positioned to provide additional structural support for the coupling of elongated bar 104 to top surface 106. Accordingly, in one embodiment, elongated bar 104 is coupled to one base plate 102 and/or frame 112. Elongated bar 104 includes a first end 118 and a second end 120. In the exemplary embodiment, base plate 102 is centrally located between first and second ends 118 and 120, respectively. Accordingly, the positioning of base plate 102 enables jig 100 to be "balanced" and "free-standing" when properly positioned on the ground at a drilling site.

In the exemplary embodiment, a first guide collar 122 and a second guide collar 124 are each coupled to elongated bar 104. Each guide collar 122 and 124 includes a substantially cylindrical side wall 126 that defines an interior channel 128. Each guide collar 122 and 124 is sized to enable a drilling tool to be slidably guided through interior channel 128. That is, each guide collar 122 and 124 has a diameter 130 that is variably selected to be slightly larger than a diameter (not shown) of the drilling tool to be inserted therethrough. The diameter of the drilling tool to be used in a drilling process is variably selected based on the diameter or size of the cross-sectional area of the bollard to be installed within the drilled hole. For example, the diameter of the drilling tool may be selected to be larger than the diameter of the bollard to be installed, such that the drilled hole is large enough to be filled with filler material (e.g., cement) after the bollard is inserted within the hole. Accordingly, in one embodiment, the drilling tool diameter is larger than the diameter of the bollard being installed, and a diameter 130 of each guide collar 122 and 124 is larger than the diameter of the drilling tool.

Generally, the diameter of the drilling tool is typically selected to be a predetermined percentage larger than the diameter of the bollard, thereby facilitating reducing filler material usage. For example, the predetermined percentage may be about 10 percent, about 20 percent, at least about 25 percent, or defined within a range between about 10 percent and about 50 percent. Accordingly, a diameter 130 of each guide collar 122 and 124 is selected based at least partially on the diameter of the bollard to be installed. Bollards are available in a variety of sizes (e.g., 3.5 inches diameter in civic, industrial, or commercial settings), and may be of any length (not shown) that enables jig 100 to function as described herein. Thus, in some embodiments, diameter 130 may be at least about 3.5 inches, or may be at least about 4.5 inches, or may be at least about 5.5 inches. Alternatively, in some embodiments, diameter 130 may be any diameter within a range of between about 3.5 inches to about 6 inches.

In one embodiment, elongated bar 104 is a unitary component that includes first guide collar 122 coupled at first end 118 of elongated bar 104 and second guide collar 124 coupled at second end 120 of elongated bar 104. Accordingly, guide collars 122 and 124 are spaced apart from each other by a predetermined distance 132 on elongated bar 104. The predetermined distance 132 is variably selected based at least partially on the length of elongated bar 104. More specifically, the length of elongated bar 104 is selected to ensure that predetermined distance 132 defines a desired spacing between adjacent bollard hole drilling locations. In one embodiment, each interior channel 128 defines a drilling axis 134, and the predetermined distance 132 is defined between the drilling axes 134 of guide collars 122 and 124.

Guide collars 122 and 124 are positioned relative to elongated bar 104 to ensure drilling axes 134 are oriented substantially perpendicularly relative to base plate 102. Accordingly, base plate 102 is oriented to enable drilling axes 134 to be substantially vertical when base plate 102 is positioned on a ground surface that is substantially planar. In addition, in some embodiments, guide collars 122 and 124 enable the drilling tool to be substantially vertical relative to the ground. For example, the drilling tool may be a distinct device that is independent of jig 100. In such an embodiment, the drilling tool may include a base (not shown), and a means for selectively moving a drill bit/head (not shown) relative to the base. The base may also include a means to selectively orient the drill bit/head at any desired angle relative to the ground surface to which the base is positioned. If the tool path is oriented obliquely relative to drilling axes 134 by an orientation or angle that is greater than a predetermined threshold angle, the drill bit/head may contact guide collars 122 and 124 as the drill bit/head is channeled through interior channel 128. Thus, guide collars 122 and 124 enable a drill operator to easily visually verify proper alignment of the drilling tool relative to jig 100.

In one embodiment, a first mounting plate 136 is coupled at first end 118 of elongated bar 104, and a second mounting plate 138 is coupled at second end 120. More specifically, in the exemplary embodiment, guide collars 122 and 124 are each coupled to elongated bar 104 via respective mounting plates 136 and 138. Mounting plates 136 and 138 provide additional surface area to facilitate coupling elongated bar 104 and guide collars 122 and 124 to each other, such as via a welding process. In addition, in the exemplary embodiment, jig 100 includes at least one alignment feature 140 coupled to each mounting plate 136 and 138, such that alignment features 140 are spaced apart from each other along elongated bar 104. Alignment feature 140 may be any mechanical device that enables jig 100 to function as described herein, such as a ring, a hook, or the like. Accordingly, each alignment feature 140 is associated with a respective guide collar 122 and 124, and rings 140 are positioned at approximately the same position relative to the drilling axes 134 of the respective guide collars 122 and 124. Thus, an alignment axis 142 extending between alignment features 140 is oriented substantially perpendicularly relative to drilling axes 134.

In operation, alignment features 140 may be used to orient drilling axes 134 vertically relative to the ground. For example, in some embodiments, a guide line (not shown) may be used to facilitate positioning jig 100 at desired drilling locations when the ground surface is uneven, non-horizontal, or not able to have drilling location marks (not shown) defined thereon. The guide line may be routed between two objects or structures across a desired path of drill hole locations. The alignment features 140 are oriented to enable the guide line to be received therethrough, prior to the guide line being tensioned to enable jig 100 to be suspended above the ground surface. Accordingly, extending the guide line substantially horizontally across the desired path enables alignment axis 142 to likewise be oriented substantially horizontally, which facilitates orienting drilling axes 134 substantially vertically relative to the ground.

One or more jigs 100 may be used to facilitate drilling bollard holes along a desired path, and how multiple jigs 100 may be used to speed up the drilling process. For example, the desired path may be defined by a marked line (e.g., a chalk line) extending across the ground. Drilling axes 134 associated with a first jig 100 may be aligned with the desired path, while maintaining the first jig 100 in the desired alignment by coupling base plate 102 to the ground. A drilling tool may then be guided along drilling axes 134 of first jig 100 to form the bollard holes. As the holes are drilled with first jig 100, a second jig 100 may be positioned at an adjacent drilling site along the desired path. Accordingly, additional hole drilling positions may be located along the desired path even while first jig 100 is in use.

Figure 2:
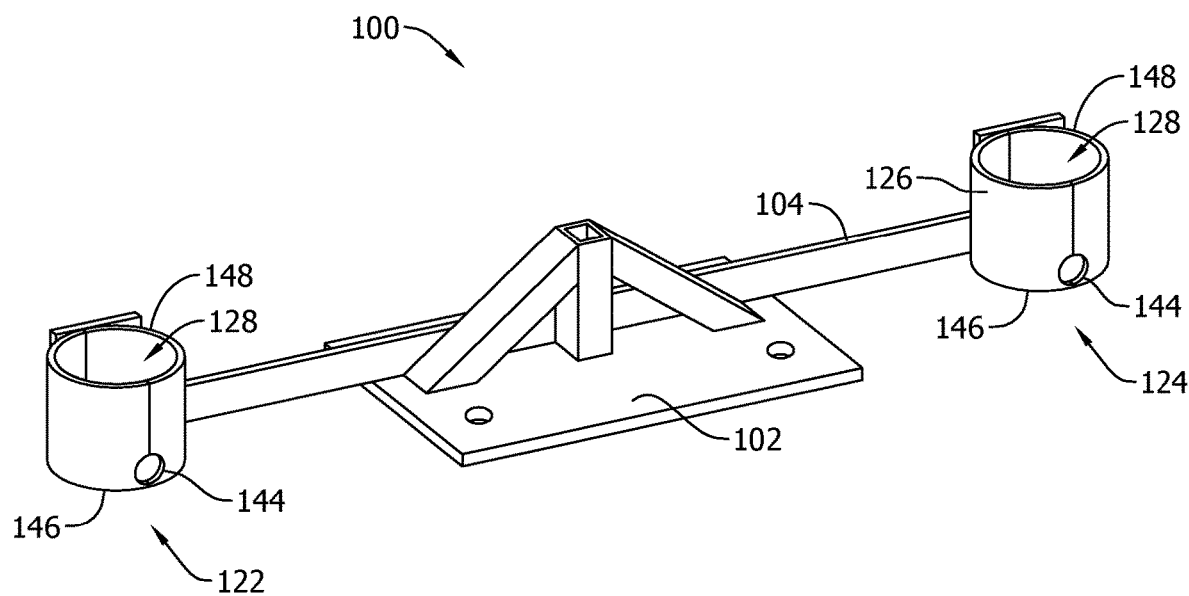
FIG. 2 is a rear perspective view of the bollard drilling jig shown in FIG. 1.

FIG. 2 is a rear perspective view of bollard drilling jig 100. In the exemplary embodiment, a side wall 126 of each guide collar 122 and 124 has a vacuum port 144 defined therein. Vacuum port 144 enables flow communication between interior channel 128 and an exterior of side wall 126. In operation, a lubricating fluid, such as water, may be channeled towards interior channel 128 as the bollard holes are drilled. Accordingly, a vacuum source (not shown) may be coupled in flow communication with vacuum port 144 to facilitate removing excess lubricating fluid from the drilling site. In the exemplary embodiment, vacuum port 144 is positioned closer to a bottom edge 146 of side wall 126 than to a top edge 148. Thus, vacuum port 144 is positioned to enable gravity draining the lubricating fluid from interior channel 128.

Figure 3:
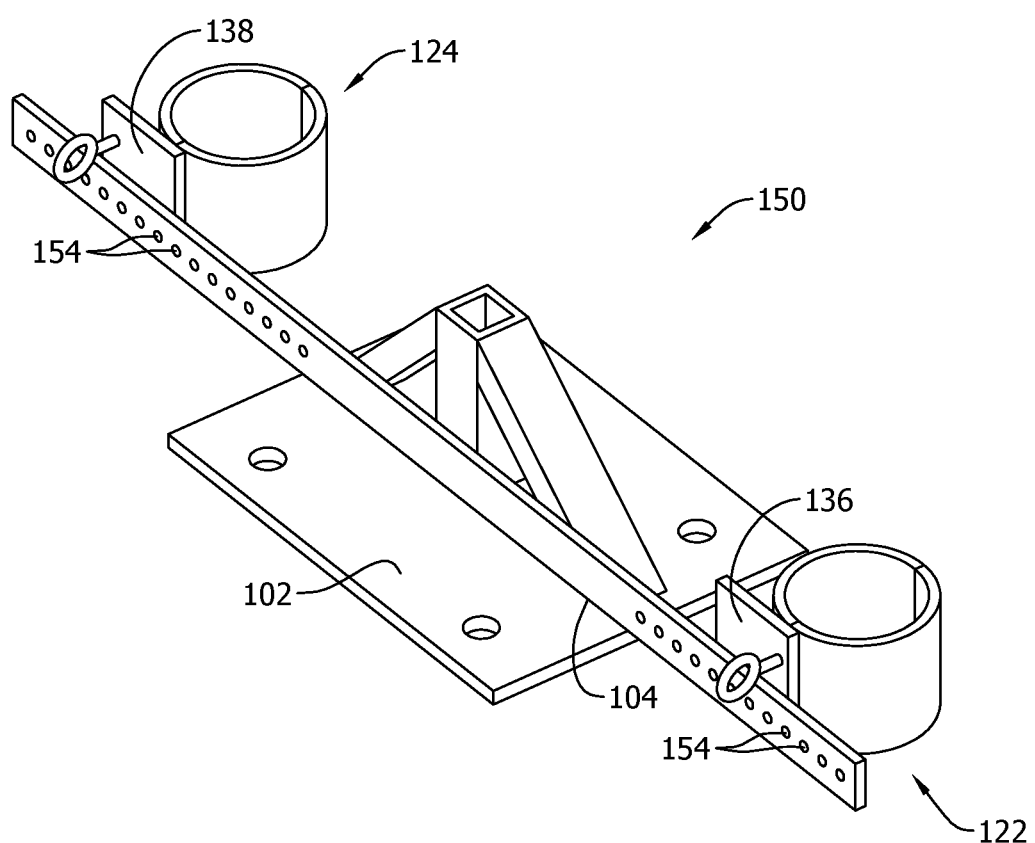
FIG. 3 is a front perspective view of an alternative bollard drilling jig.
Figure 4:
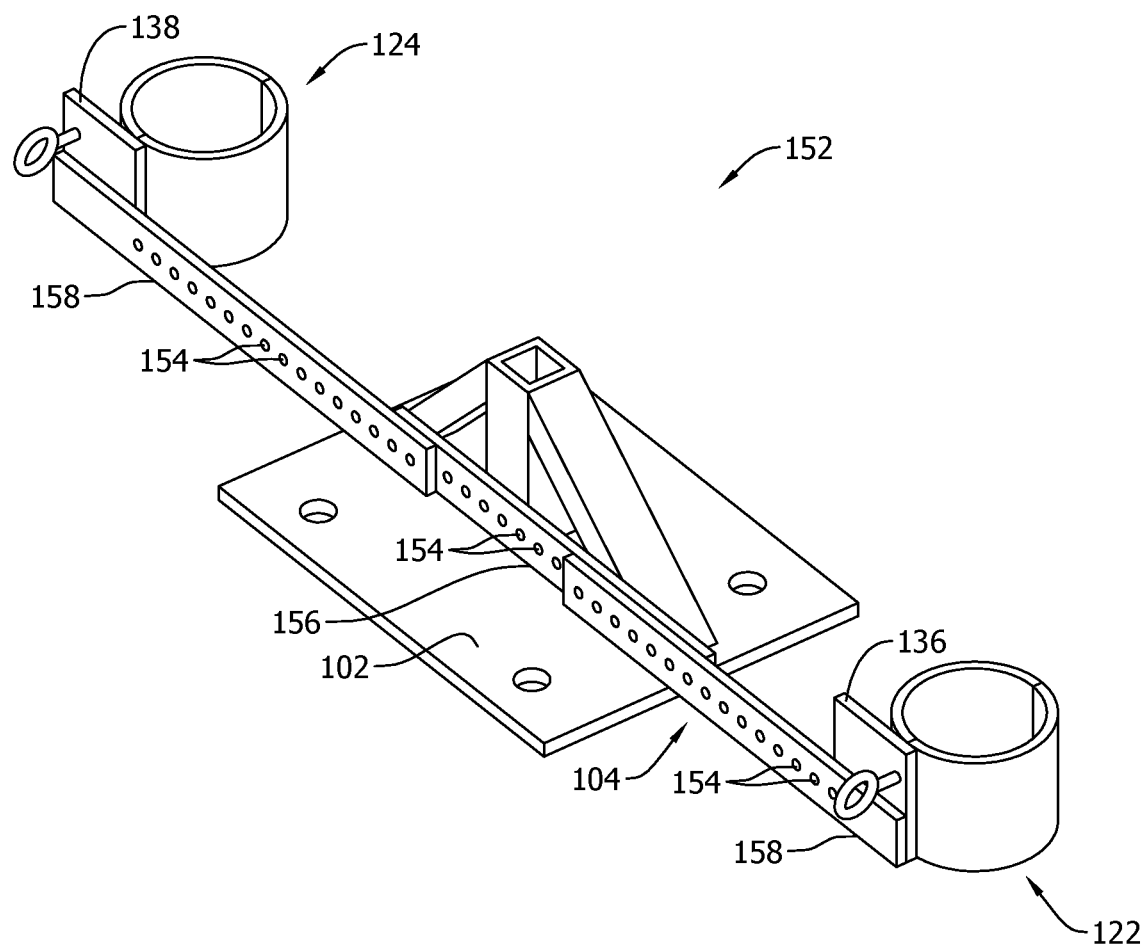
FIG. 4 is a front perspective view of a yet another alternative bollard drilling jig.

FIG. 3 is a front perspective view of an alternative bollard drilling jig 150, and FIG. 4 is a front perspective view of a further alternative bollard drilling jig 152. In some embodiments, a distance 132 between guide collars 122 and 124 is selectively adjustable to enable the desired spacing between bollard holes to be selectively varied and eventually drilled. For example, referring to FIG. 3, elongated bar 104 has a plurality of holes 154 defined therein and such that holes 154 are spaced at regular intervals. The regular intervals are variably selected to enable the spacing between guide collars 122 and 124 to be established at common distances (e.g., 3 feet, 4 feet, or 5 feet). In the exemplary embodiment, guide collar 122 and/or 124 is selectively moveable relative to elongated bar 104 to enable modify the spacing therebetween to be variably selected. For example, each mounting plate 136 and 138 may be coupled at different relative locations along elongated bar 104 as defined by the regular intervals of holes 154. Mounting plates 136 and 138 may be affixed at a desired location along elongated bar 104 with mechanical means, such as pins, bolts, and the like, that are extendable through mounting plates 136 and 138 and a respective hole 154.

Referring to FIG. 4, elongated bar 104 is a multi-part assembly including a main portion 156 and two moveable portions 158. In the exemplary embodiment, main portion 156 is coupled to base plate 102 and to frame 112, and moveable portions 158 are translatable and selectively coupleable to main portion 156. For example, each of main portion 156 and moveable portions 158 have holes 154 defined therein and spaced at regular intervals. Each guide collar 122 and 124 is affixed to a respective moveable portion 158. Accordingly, one or both of moveable portions 158 are translatable relative to main portion 156 to adjust the length of elongated bar 104, and to modify the spacing between guide collars 122 and 124. Moveable portions 158 may be affixed at a desired location along main portion 156 with mechanical means, such as pins, bolts, and the like, that are extendable through respective holes 154 in main portion 156 and moveable portions 158.

The embodiments described herein relate to bollard drilling jigs for use in drilling holes for bollard installation therein. The jig includes at least two guide collars that may be spaced from each other by a predetermined distance on the jig. The predetermined distance may correspond to a desired spacing between drilling locations, which enables the bollard holes to be formed in a quick and consistently-spaced manner. When drilling a plurality of holes along a predefined path, multiple jigs may be used speed up the process. For example, a first jig may be aligned on the predefined path and a drilling tool positioned to interact with the first jig. As holes are drilled with the first jig, a second jig may be positioned at another drilling site along the path. Accordingly, at least the next two hole locations may be aligned along the predefined path with the second jig, which is faster and more efficient than measuring and marking each hole location individually.

Exemplary embodiments of a bollard drilling jig are described above in detail. Although the bollard drilling jig herein is described and illustrated in association with standard-sized civic and industrial bollards, the invention is also intended for use in forming other drilled holes as well. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bollard drilling jig comprising:
    a base plate;
    an elongated bar coupled to the base plate; and
    at least two guide collars spaced apart from each other on the elongated bar, the at least two guide collars each comprising an interior channel that is sized to receive a drilling tool therethrough, wherein the at least two guide collars each comprise a side wall that defines the interior channel, and a vacuum port defined in the side wall.

2. The bollard drilling jig in accordance with claim 1, wherein at least one of the at least two guide collars is selectively moveable relative to the elongated bar to modify the spacing between the at least two guide collars.

3. The bollard drilling jig in accordance with claim 1, wherein the elongated bar is selectively adjustable in length to modify the spacing between the at least two guide collars.

4. The bollard drilling jig in accordance with claim 1 further comprising at least two alignment features spaced from each other on the elongated bar, wherein an alignment axis extending between the at least two alignment features is oriented substantially perpendicularly with the drilling axis.

5. The bollard drilling jig in accordance with claim 1, wherein the interior channel defines a drilling axis that is oriented substantially perpendicularly relative to the base plate.

6. The bollard drilling jig in accordance with claim 1, wherein each guide collar has a diameter of at least about 3.5 inches.

7. A bollard drilling jig comprising:
    a base plate;
    an elongated bar extending across the base plate such that a first end and a second end of the elongated bar are each positioned a distance from the base plate; and
    a guide collar coupled to each of the first end and the second end of the elongated bar, wherein the guide collar comprises an interior channel that is sized to receive a drilling tool therethrough, wherein the guide collar comprises a side wall that defines the interior channel, and a vacuum port defined in the side wall.

8. The bollard drilling jig in accordance with claim 7, wherein the guide collar is selectively moveable relative to the elongated bar.

9. The bollard drilling jig in accordance with claim 7, wherein the elongated bar is selectively adjustable in length to modify the spacing between guide collars on the first end and the second end.

10. The bollard drilling jig in accordance with claim 7, wherein the base plate is centrally located between the first end and the second end of the elongated bar.

11. The bollard drilling jig in accordance with claim 7, wherein the base plate comprises at least two mounting holes defined therein.

12. The bollard drilling jig in accordance with claim 7, wherein the interior channel defines a drilling axis that is oriented substantially perpendicularly relative to the base plate.

13. A bollard drilling jig comprising:
   an elongated bar;
   at least two guide collars spaced apart from each other on the elongated bar, the at least two guide collars each comprising an interior channel that is sized to receive a drilling tool therethrough, wherein the interior channel defines a drilling axis; and
   at least two alignment features spaced from each other on the elongated bar, the at least two alignment features configured to receive a tensioned line therethrough, wherein the at least two alignment features are oriented such that an alignment axis, defined along the tensioned line and extending between the at least two alignment features, is oriented substantially perpendicularly with the drilling axis.

14. The bollard drilling jig in accordance with claim 13 further comprising a base plate coupled to the elongated bar, wherein the drilling axes are oriented substantially perpendicularly relative to the base plate.

15. The bollard drilling jig in accordance with claim 13, wherein the at least two guide collars each comprise a side wall that defines the interior channel, and a vacuum port defined in the side wall.

16. The bollard drilling jig in accordance with claim 13, wherein at least one of the at least two guide collars is selectively moveable relative to the elongated bar to modify the spacing between the at least two guide collars.

17. The bollard drilling jig in accordance with claim 13, wherein the elongated bar is selectively adjustable in length to modify the spacing between the at least two guide collars.

18. The bollard drilling jig in accordance with claim 13, wherein the at least two alignment features comprise at least one of a ring or a hook.

\* \* \* \* \*